UNITED STATES PATENT OFFICE.

STEPHEN BOWERMAN, OF BATTLE CREEK, MICHIGAN.

IMPROVED CEMENT FOR ROOFING.

Specification forming part of Letters Patent No. 42,925, dated May 31, 1864.

*To all whom it may concern:*

Be it known that I, STEPHEN BOWERMAN, of Battle Creek, in the county of Calhoun and State of Michigan, have invented a new and useful cement for roofs of houses and for saturating the sheathing or "shingles" used in making roofs of houses, preparatory to applying the same thereto; and I do declare the following to be a true and exact description thereof, and of the process of preparing and compounding the same.

The object of my invention is to prepare the wooden shingles or sheathing of dwelling-house roofs or other roofs in such manner as shall make the same far more durable than the ordinary unprepared shingle or sheathing, which so soon becomes rotten and perishable, owing to exposure to varying temperature and the inclemencies of the weather; and, secondly, to render such material proof against the "warping" action of the weather and the rays of the sun, by reason of which ordinary roofs are so liable to "leak." To effect this I first prepare a cement as follows, to wit: I take of coal-tar, one part; fine-ground gypsum, one part; pure clay, dried and finely pulverized, one part, and salt, fine ground, one-half part. Of the aforegoing ingredients the coal-tar is first put into a suitable vessel and melted by the application of a gentle fire. When the tar becomes thoroughly melted and hot the gypsum is then added, and the two ingredients thoroughly mixed by stirring the same in any suitable manner. The pure clay, in a pulverized state, is then added and mixed, after which the salt is added and the whole thoroughly mixed. I do not, however, confine myself to the order of mixing the several ingredients, as the gypsum, the clay, and the salt may all be added to the melted coal-tar at the same time and still effect the same purpose; but I prefer to add them together or mix them in the order described, as being most likely to thoroughly incorporate them one with another. After these ingredients are thoroughly mixed and in a highly-heated state the wooden shingles are then immersed in the liquid compound and suffered to remain a sufficient length of time to thoroughly incorporate a portion of the compound into the wood. The shingles are then taken out, after which they soon become dry and fit for use, and thus prepared are in a great measure imperishable, and not liable to warp by the action of the sun and the weather. After the roof is laid with shingles or sheathing thus prepared a heavy coating of water-lime applied thereto will in a great measure render it fire-proof, and at the same time add to the imperishable qualities of the roof.

Instead of using the water-lime as a wash for the roof, it may be added as one of the elements of the compound cement in the relative proportion of one part, and to be incorporated with the coal-tar at the same time the other ingredients are mixed therewith.

Instead of saturating the sheathing or shingles in the cement, they may be immersed in heated coal-tar, and then coated with slaked lime. When laid on the roof the cement is laid on and thoroughly melted and seared in all openings, and while hot; or should it get cold hot sand is sifted on to form a hold for a coat of water-lime, either in a wash or a coat of plaster.

Having thus described my invention, what I claim as new, and desire to secure by Letters Patent of the United States, is—

A compound cement for roofing purposes, prepared and applied substantially in the manner and for the purpose set forth.

STEPHEN BOWERMAN.

Witnesses:
M. B. RUSSELL,
JOHN A. MEECH.